March 24, 1970  B. G. HURD  3,502,146
OIL RECOVERY PROCESS WITH VISCOUS DISPLACING
LIQUID FORMED IN SITU
Filed Dec. 22, 1967

BILLY G. HURD
INVENTOR

BY *William L. Jackson*

ATTORNEY 3,502,146
OIL RECOVERY PROCESS WITH VISCOUS
DISPLACING LIQUID FORMED IN SITU
Billy G. Hurd, Dallas, Tex., assignor to Mobil Oil
Corporation, a corporation of New York
Continuation-in-part of application Ser. No. 673,882,
Oct. 9, 1967. This application Dec. 22, 1967, Ser.
No. 692,819
Int. Cl. E21b 43/22, 43/12
U.S. Cl. 166—270                30 Claims

ABSTRACT OF THE DISCLOSURE

This specification discloses an oil recovery process which involves the sequential injection into an oil reservoir of first and second solutes to form a viscous displacing liquid. The second solute exhibits a saturation-adsorption value in its carrier liquid which is less than the saturation-adsorption value exhibited by the first solute in its carrier liquid. As the liquids move through the reservoir the transport rate of the second solute is greater than the transport rate of the first solute such that they become mixed within the reservoir and interact to produce the viscous displacing liquid. Preferably, the first solute exhibits a saturation-adsorption value in the second injected carrier liquid which is less than that exhibited in the first injected carrier liquid. The carrier liquids may be aqueous mediums and the sorption characteristics of the solutes in such liquids may be controlled through salinity and/or pH adjustments.

CROSS-REFERENCE TO RELATED APPLICATION

This is a continuation-in-part of application Ser. No. 673,882, filed Oct. 9, 1967.

BACKGROUND OF THE INVENTION

Field of the invention

This invention relates to the recovery of oil from subterranean oil reservoirs, and more particularly, to new and improved secondary recovery operations in which viscous displacing liquids are formed within such reservoirs.

DESCRIPTION OF THE PRIOR ART

In the recovery of oil from oil-bearing reservoirs it usually is possible to recover only a minor portion of the original oil in place by the so-called primary recovery methods which utilize only the natural forces present in the reservoir. Thus, a variety of supplemental recovery techniques have been employed in order to increase the recovery of oil from substerranean reservoirs. In these supplemental techniques, which are commonly referred to as secondary recovery operations although in fact they may be primary or tertiary in sequence of employment, fluid is introduced into the reservoir in order to displace the oil therein to a suitable production system through which the oil may be withrdawn to the surface of the earth. The displacing medium may be a gas, an aqueous liquid such as fresh water or brine, an oil-miscible liquid such as butane, or a water and oil-miscible liquid such as an alcohol. Generally, the most promising of the secondary recovery techniques involves the injection into the reservoir of an aqueous flooding medium, either alone or in combination with other fluids.

One difficulty which is often encountered in secondary recovery operations is the relatively poor sweep efficiency of the injected displacing liquid; that is, the tendency of the displacing liquid to channel through certain portions of the reservoir and to by-pass other portions. Such poor sweep efficiency is occasioned by differences between the viscosity of the injected displacing medium and the in-situ reservoir oil and also by permeability variations within the reservoir. The reservoir may comprise a plurality of fairly well defined zones of widely diverse permeabilities. The injected displacing fluid preferentially flows through the more permeable zones of the reservoir thus leading to premature breakthrough of the displacing fluid at the production well or wells.

Even when the reservoir exhibits a relatively uniform permeability throughout, a situation referred to as instability fingering may develop in those instances where the viscosity of the injected displacing fluid is significantly less than the viscosity of the in-situ reservoir oil. In this situation, the less viscous displacing fluid tends to develop fingers or bulges which may be caused by points of minute heterogeneities in the reservoir. These fingers of displacing fluid tend to become extended in the direction of flow and travel at a faster rate than the remainder of the injected fluid, thus again resulting in premature breakthrough at the production system.

Various techniques have been proposed in order to improve the sweep efficiency of the injected displacing fluid and thus avoid premature breakthrough. For example, it has been proposed to selectively inject plugging agents into the more permeable zones of the reservoir in order to effect an overall decrease in permeability variation. Another technique for increasing sweep efficiency involves the utilization of a relatively viscous displacing liquid. Thus, in waterflooding operations, for example, thickening agents have been added to at least a portion of the flood water in order to increase the viscosity thereof. The viscosity of the displacing liquid may be increased prior to its injection into the reservoir. Alternatively, the viscosity of the liquid displacing medium may be increased in-stu, in order to avoid a reduction in injectivity at the injection wells. For example, in U.S. Patent No. 3,208,518 to John T. Patton, there is disclosed a waterflooding process in which the viscosity of the aqueous displacing medium is increased in-situ through the use of high molecular weight ionic polymers under controlled pH conditions.

SUMMARY OF THE INVENTION

In accordance with the present invention, there are provided new and improved methods of forming a viscous displaceing liquid within a reservoir through the interaction of sequentially injected solutes exhibiting certain adsorption characteristics within the reservoir. The invention is practiced in a subterranean oil reservoir which is penetrated by spaced injection and production systems defining a recovery zone of the reservoir. In carrying out a preferred embodiment of the invention, a first carrier liquid is injected into the reservoir through the injection system. This carrier liquid contains a first solute which is interactive with a subsequently injected second solute to form a viscous displacing liquid within the reservoir. Thereafter, a second carrier liquid containing the above-referred-to second solute is injected into the reservoir via the injection system. The second solute exhibits a saturation-adsorption value in the second carrier liquid which is less than the saturation-adsorption value of the first solute in its respective carrier liquid whereby as the liquids move through the reservoir the mass transport rate of the second solute is greater than the mass chromatographic transport rate of the first solute. By "saturation-adsorption" is meant the maximum adsorption of solute from its carrier on the reservoir solids and is expressed in terms of weight of solute per unit weight or volume of solids. Thus, the first and second solutes become mixed and interact within the reservoir to produce a displacing liquid of a viscosity greater than the initial viscosities of the carrier liquids. This viscous displacing liquid is moved through the reservoir in the direction of the production system by the injection of a suitable driving fluid and the displaced oil is recovered from the production system.

In another aspect of the invention, the first injected solute exhibits a saturation-adsorption value in the second carrier liquid which is less than that exhibited in the first carrier liquid. By this technique, desorption by the second carrier liquid of the first solute from the rock surfaces within the reservoir is enhanced and the efficacy of the mechanism leading to the production of the viscous displacing liquid is increased.

In a preferred embodiment of the invention as applied in a waterflood procedure, the first and second carrier liquids are aqueous mediums and the adsorption characteristics of the solutes are controlled through suitable adjustment of the salinity of such mediums. In carrying out this embodiment of the invention, the first carrier liquid exhibits a greater salinity than the second carrier liquid. Because of the salinity characteristics of the respective carrier liquids, the saturation-adsorption value of the second solute in the second carrier liquid is less than the saturation-adsorption value of the first solute in the first carrier liquid. In addition, the saturation-adsorption value of the first injected solute in the second carrier liquid is less than that exhibited by the first solute in the first carrier liquid.

In yet another embodiment of the invention the solute injected in the first aqueous carrier liquid functions as a thickening agent without further interaction with a second solute. Thus, the solute in the first carrier liquid may be a water-soluble or dispersible polymer which exhibits an increased viscosity effect in aqueous solution with increased concentration. The second carrier liquid is an aqueous medium of lower salinity than the first and need not contain a solute. The second carrier liquid functions as a stripping agent with respect to the polymer previously adsorbed from the first carrier liquid. As the second carrier liquid moves through the formation the polymer concentration therein builds up and, hence, the viscosity thereof increases. Water-thickening polymers typically exhibit a greater viscosifying effect in aqueous solutions of low salinity than in those of high salinity. Thus, the lower salinity characteristics of the second carrier liquid further enhance the viscosifying effect of the polymer.

IN THE DRAWINGS

DESCRIPTION OF SPECIFIC EMBODIMENTS

Figure 1:
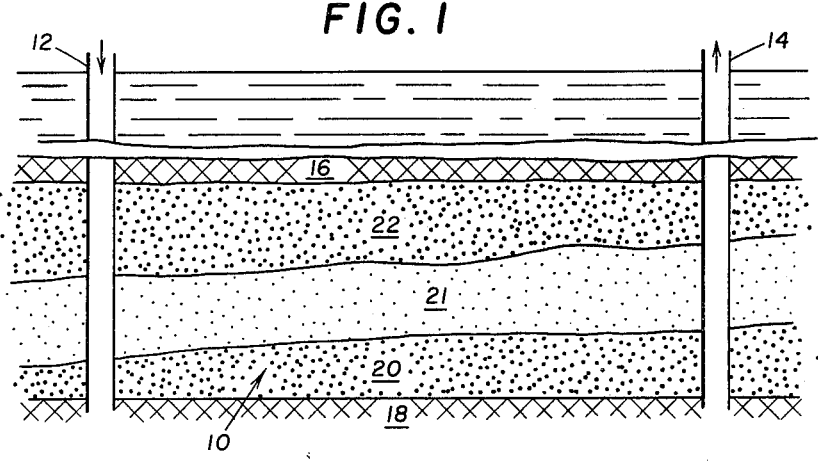
FIGURE 1 is a vertical section of an oil reservoir taken between injection and production wells showing exemplary permeability variations within the reservoir.

The phenomenon of adsorption whereby a solute, either in true solution or in a colloidal dispersion in carrier fluid, is deposited on solid surfaces contacted by the carrier liquid is well known to those skilled in the art. This phenomenon is manifested in secondary recovery operations such as waterflooding in which solutes dissolved or dispersed in the water or other displacing medium tend to be adsorbed from the displacing medium onto the rock surfaces within the reservoir. In fact, this tendency is so pronounced that it has proven to be a major obstacle in successfully accomplishing such operations as the so-called polymer flood in which organic polymers which act as viscosifiers are dissolved or dispersed in an aqueous flooding medium. Oftentimes the rate of adsorption is so high that it is economically impractical to maintain the polymeric materials in adequate concentrations in the flood water.

The amount of a solute adsorbed from a carrier liquid onto a given surface area of reservoir rock depends, within limits, upon the concentration of the solute in the carrier liquid. The higher the concentration, the greater the amount of solute that will be adsorbed. When a solution or dispersion is placed in contact with an adsorbing reservoir rock the amount of solute adsorbed will gradually increase and the concentration of the solute in the carrier liquid will decrease until an equilibrium concentration is established at which the rates of desorption and adsorption are equal. If the concentration of solute in the carrier liquid is then increased, the amount of adsorbate will increase to a new equilibrium value and, conversely, if the concentration is decreased the adsorbent reservoir rock will lose adsorbed solute to the surrounding solution until equilibrium is once again established. This relationship will exist for a given adsorbent-solute-liquid system until such time as substantially all adsorption sites on the adsorbent are satisfied. Thereafter, an increase of solute in solution will result in little or no additional solute being adsorbed on the adsorbent. At this point, the system has reached a state of saturation-adsorption. The maximum amount of solute which can be adsorbed from a given carrier liquid per unit volume or weight of adsorbent is termed the "saturation-adsorption value" of the solute for the particular carrier liquid and is a measure of the capacity of this solute to be adsorbed from the liquid.

Solutes which adsorb on solid surfaces can be transported through a porous adsorbent by a chromatographic adsorption-desorption process in which the adsorbing solute moves at a rate lower than that of the carrier liquid. The rate of movement of the adsorbing solute relative to the carrier liquid will depend upon the adsorption characteristics of the solute in the solid-liquid system, especially the equilibrium solute concentration at which saturation-adsorption occurs and the rate of adsorption and desorption of solute. As a general rule, the relative rate of solute-carrier liquid movement becomes higher as this equilibrium solute concentration increases and as the tendency of the solute to be adsorbed decreases.

In the present invention advantage is taken of the above-described phenomena to cause sequentially injected first and second solutes to mix at a location in the reservoir spaced from the injection system where they react to form a viscous displacing liquid. The first and second solutes may be any materials with the proper sorption characteristics which are interactive with one another to form a product which acts as a viscosifier with regard to one or both of the injected carrier liquids. Thus, as is described in greater detail hereinafter, the carrier liquids may be comprised of water and the first and second solutes may be interactive to form a water-thickening polymer.

The adsorption characteristics of the first and second solutes in their respective carrier liquids are such that the first solute is more strongly adsorbed than the second. Thus, as the carrier liquids move through the reservoir the ratio of the rate of advance of the second solute to the rate of advance of its carrier liquid is greater than the ratio of the rate of advance of the first solute to the rate of advance of its carrier liquid. It will be recognized that, disregarding the radial flow geometry which is attendant to the injection of fluids within an oil reservoir, the rate of advance of the first and second carrier liquids will be substantially the same. Thus, the mass transport rate of the second solute will be greater than the mass chromatographic transport rate of the first solute until ultimately the solutes are mixed within the reservoir.

It is preferred in addition to the solute-liquid adsorption characteristics described above, that the first solute be more strongly adsorbed from the first carrier liquid than from the subsequently injected second carrier liquid. In this case, the second carrier liquid will exhibit an enhanced stripping action and the concentration of the first solute in the second carrier liquid will build continuously as it traverses those portions of the reservoir in which is adsorbed the first solute. This will further promote the mixing of the solutes within the reservoir.

The present invention is carried out in a recovery zone of a subterranean oil-bearing reservoir. As will be understood by those skilled in the art, by the term "recovery zone," as used herein and in the appended claims, is meant that portion of a reservoir through which oil is displaced to the production system by the injected displacing medium. The injection and production systems each may comprise one or more wells extending from the surface of the earth into the subterranean oil reservoir and such wells may be located and spaced from one another in any desired pattern. For example, the so-called "line flood" pattern may be utilized, in which case the injection and production systems comprise rows of wells spaced from one another. In this type of pattern the recovery zone, as defined by the spaced rows of injection and production wells, generally will be that portion of the reservoir underlying the area between these spaced rows. Exemplary of other patterns which may be used is the so-called "circuar flood" pattern in which the injection system comprises a central injection well and the production system comprises a plurality of production wells spaced about the injection well. Of course, the injection and production systems each may consist of only a single well in which case the recovery zone, as defined by the spaced injection and production wells, will be the portion of the reservoir underlying a generally elliptical area between these wells which is subject to the displacing action of the injected flooding medium. The above and other patterns are well known to those skilled in the art and for a more detailed description of such patterns reference is made to Uren, L. C., Petroleum Production Engineering—Oil Field Exploitation, 2nd edition, McGraw-Hill Book Company, Inc., New York and London, 1939, and more particularly to the section entitled "The Water Flooding Process," appearing at pages 444–459.

It also will be recognized that the invention may be carried out utilizing one or more dually completed injection-production wells of the type, for example, disclosed in U.S. Patent No. 2,725,106 to Ralph Spearow. This arrangement sometimes may be utilized to advantage in a relatively thick oil reservoir in which it may be desirable to displace the oil in the reservoir upwardly and recover such oil from the upper portion of the reservoir. In this instance, the injection system normally would comprise the lower completion interval of one or more dually completed wells of the type described in the aforementioned patent to Spearow and the production system would comprise the upper completion interval of one or more of such wells. In this case, of course, the recovery zone would be that portion of the reservoir subject to the displacing action of the flooding medium as it moves upwardly through the reservoir.

Turning now to FIGURE 1, there is illustrated an oil reservoir 10 penetrated by spaced injection and production wells 12 and 14, respectively. While, for the purpose of simplicity in describing the invention, only one injection well and one production well are shown, it will be recognized that in practical applications of the invention a plurality of such wells may be, and in most cases will be, utilizde. Thus, the wells 12 and 14 may each be considered to be located in rows of spaced injection and production wells, as in the line flood pattern described above. Also, the injection well 12 may be considered to be the central well in a circular flood pattern, e.g., a five-spot or nine-spot pattern, and the production well 14 one of the peripheral wells.

The reservoir 10 is bounded by layers 16 and 18 of relatively impermeable rock which overlie and underlie the reservoir. The reservoir is shown as being comprised of a number of fairly well defined zones 20, 21, and 22 which differ considerably in permeability in the direction of flow from the injection well to the production well. These zones may, of course, slope or have various curvatures, but typically they extend generally parallel to one another as shown. Some of the zones may be discontinuous; that is, they may terminate or begin at various locations as viewed in the direction of flow. Also, while only vertical permeability variation is shown in the reservoir 10, it will be recognized that the rservoir may exhibit horizontal permeability variation; that is, a horizontal section through the reservoir may reveal zones of diverse permeabilities.

Of the reservoir zones illustrated, those indicated by reference numerals 20 and 22 are considered to be zones of relatively low permeability with the zone 21 being a zone of relatively high permeability. Each of the reservoir zones 20, 21, and 22 contain oil which is desired to be displaced to the production well 14 by injecting a suitable fluid through the injection well 12. It will readily be recognized that upon injecting a displacing fluid through the well 12 the fluid will flow preferentially through the zone 21 of high permeability with the result that relatively rapid displacement occurs therein as compared with the low permeability zones 20 and 22. Thus, the high permeability zone 21 will be "swept out" and the displacing fluid will break through at the production well 14 long before the injected displacing fluid is moved completely through the low permeability zones 20 and 22. Once breakthrough occurs at the production wells, the effectiveness of the secondary recovery process will be seriously restricted and additional oil can be recovered from the relatively low permeability zones 20 and 22 only at an increased expense.

In recovering oil in accordance with the preferred embodiment of the invention, a first carrier liquid containing a first solute is injected through the injection well 12 and displaced into the reservoir 10. The first solute exhibits a saturation-adsorption value in the first carrier liquid which is designated herein as $C_{11}$. Subsequent to the injection of a suitable amount of the first carrier liquid and solute, a second carrier liquid containing a second solute is injected through the injection well into the reservoir. The second solute exhibits in the second carrier liquid a saturation-adsorption value $C_{22}$ which is lower than the saturation-adsorption value $C_{11}$ of the first solute in the first carrier liquid. Thus, as the carrier liquids move through the reservoir in the direction of the production well 14, the mass transport rate of the second solute increases relative to the mass transport rate of the first solute such that the first and second solutes are ultimately mixed within the reservoir whereby they interact to form a viscous displacing liquid within the reservoir. This displacing liquid is moved through the reservoir in the direction of the producton well by a suitable driving fluid which is injected through the injection well 12. The driving fluid may take any suitable form such as alternate slugs of gas and water although it normally will be an aqueous flooding medium as in conventional waterflooding. The driving fluid may be the same as the second carrier liquid, except of course, that it need not contain the second solute.

Figure 2:
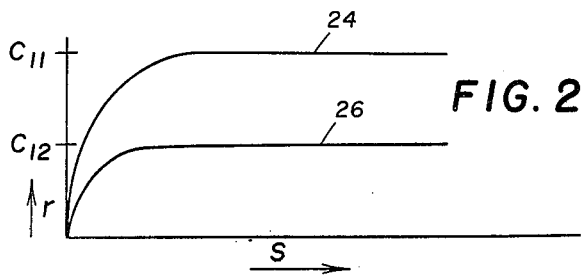
FIGURE 2 is an illustration showing adsorption isotherms of a first injected solute in the first and second carrier liquids.

Preferably, the first solute exhibits a saturation-adsorption value $C_{12}$ in the second carrier liquid which is substantially less than the saturation-adsorption value $C_{11}$. Thus, as the second carrier liquid moves through the reservoir, description of the first solute from the reservoir rock surfaces is effected and the concentration of the first solute in the second carrier liquid will build continuously as the second carrier liquid traverses the reservoir containing the first solute adsorbed thereon. Typical adsorption characteristics of a first solute for which $C_{12}$ is less than $C_{11}$ are illustrated graphically in FIGURE 2 which shows adsorption isotherms of the first solute in the first and second carrier liquids. In FIGURE 2, the equilibrium concentration S in weight of solute per volume of carrier liquid is plotted on the abscissa and the adsorption $r$ in weight of solute adsorbed per volume of reservoir rock is plotted on the ordinate. Curve 24 is the adsorption isotherm of the first solute in the first carrier liquid, and curve 26 is the adsorption isotherm for the first solute in the second carrier liquid. The second carrier liquid, which acts as a stripping agent with regard to the first solute, will at equilibrium conditions desorb a mass of solute equal to the difference between the adsorption maxima $C_{11}$ and $C_{12}$ for each unit volume of saturated reservoir rock traversed. Thus, the only limitation on the concentration of the first solute in the second carrier liquid will be that imposed by the solubility or dispersibility of the solute.

It is preferred in practicing the invention that a buffer liquid be introduced into the reservoir between the first and second carrier liquids in order to prevent the interaction of the solutes to produce the viscous displacing liquid adjacent the injection well. The buffer liquid desirably is selected such that the saturation-adsorption value of the first solute therein, designated herein as $C_{1b}$, is greater than the saturation-adsorption value $C_{12}$. Thus, the desorbing action of the buffer liquid with respect to the first solute is less as it moves through the reservoir than the desorbing action of the second carrier liquid with respect to the first solute. Preferably, the saturation-adsorption value $C_{1b}$ is at least as great as the saturation-adsorption value $C_{11}$ in order to limit the dispersion of the first solute within the reservoir.

Turning now to FIGURES 3a, 3b, 3c, and 3d, there is shown an idealized reservoir model illustrating the sequential locations and flow paths of the various liquids injected in accordance with the present invention. Fluid movement through the model is shown as being from left to right. The reservoir model is depicted as having a high permeability zone 28 and a low permeability zone 29. By way of example, the zones 28 and 29 may be considered as corresponding generally to the zones 21 and 20, respectively, shown in FIGURE 1.

Figure 3A:
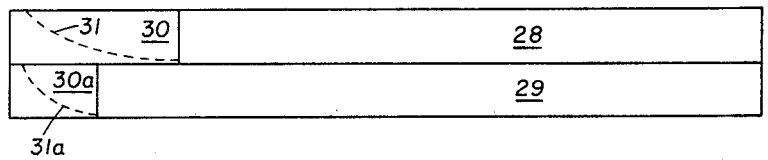
FIGURES 3a, 3b, 3c, and 3d are diagrammatic illustrations showing the progressive flow of injected fluids through adjacent reservoir zones of dissimilar permeabilities.

In the situation depicted by FIGURE 3a, the first carrier liquid containing the first solute has been injected into the reservoir to form liquid banks 30 and 30a. The zones 28 and 29 will take the injected liquids in amounts generally proportional to their permeabilities so that at the end of the first injection step the first carrier liquid will be distributed as shown with the major portion thereof contained in the high permeability zone 28. The concentration of the first solute in the carrier liquid relative to its concentration in the carrier liquid as injected into the reservoir is indicated in ordinate in FIGURE 3a by broken lines 31 and 31a. As shown, the solute concentration is at or near its original concentration near the injection well and will gradually decrease with distance from the injection well.

Figure 3B:
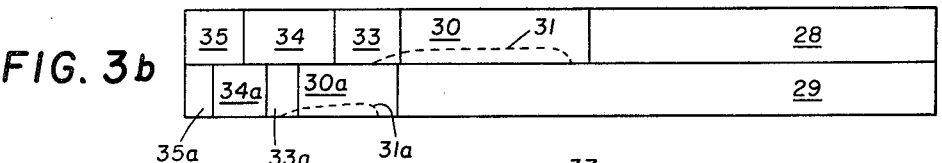

After injection of the first carrier liquid, the buffer liquid, the second carrier liquid containing the second solute, and the driving fluid are injected in sequence in order to obtain the distribution shown in FIGURE 3b. In FIGURE 3b the buffer liquid, the second carrier liquid, and the driving fluid are identified in zone 28 by reference characters 33, 34, and 35, respectively, and in zone 29 by the same reference characters subscripted by a. As illustrated by broken lines 31 and 31a in FIGURE 3b, the concentration of the solute in the first carrier liquid is fairly even throughout due to adsorption and desorption as the carrier liquid is displaced through the reservoir. Also, the buffer liquid will exhibit some concentration of the first solute due to desorption.

As the solute bands are transported through the reservoir they will tend to be elongated and attenuated by adsorption and dispersion. In addition, the radial flow geometry existing in a reservoir will tend to narrow the solute bands and the slug of buffer liquid as they are moved outwardly into the reservoir from the point of injection.

Figure 3C:
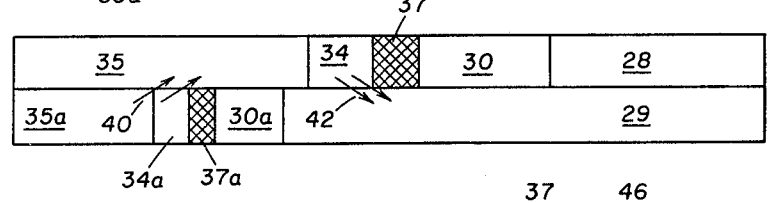
Figure 3D:
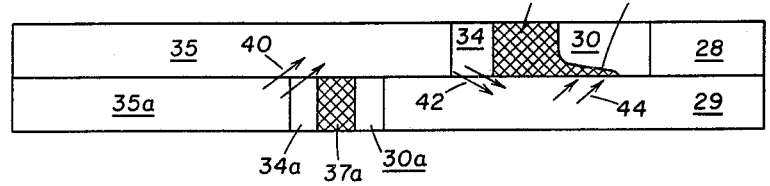

For the purpose of illustration, the second solute is considered to be non-adsorbing in its carrier liquid. In addition, dispersion is considered to be negligible so that the second solute is transported at a square wave concentration, i.e., at the same concentration as originally injected into the reservoir. In time, as the first and second carrier liquids and the buffer liquid are moved through the reservoir, the second solute will overtake and become mixed with the first solute as shown in FIGURE 3c. As the first and second solutes become mixed they interact to form a displacing liquid of increased viscosity as indicated by the cross-hatched sections 37 and 37a in layers 28 and 29, respectively.

The presence of the slugs of relatively viscous displacing liquid in the reservoir will tend to cause cross-flow of the injected fluids between the zones 28 and 29, as indicated by the arrows 40 and 42 in FIGURE 3c. As the flood water or other injected liquid in the high permeability zone 28 is diverted into the low permeability zone 29 it will carry the second solute into the low permeability zone in front of the bank 37 of viscous displacing liquid. The liquid will tend to move back into the more permeable zone as it advances beyond the bank 37 of viscous displacing liquids as indicated by arrows 44 in FIGURE 3d. However, as this occurs the second solute contained in the liquid will become mixed with the first solute ahead of the bank 37, thus producing additional viscous displacing liquid at the interface between the high and low permeability zones. This additional displacing liquid formed at this interface is indicated by the reference numeral 46 in FIGURE 3d. As will be evident from an examination of FIGURE 3d, the displacing liquid 46 will tend to keep the diverted fluid flowing within the low permeability zone.

The invention may be practiced with solutes chosen to produce a displacing liquid of any suitable viscosity. Usually, it will be preferred to produce a displacing liquid which exhibits a mobility ratio of no greater than one with respect to the reservoir oil. The mobility ratio $\gamma$ is expressed by the relationship:

$$\gamma = \frac{K_d \mu_o}{K_o \mu_d} \qquad (1)$$

wherein:

$K_o$ is the relative permeability to oil,
$K_d$ is the relative permeability to displacing liquid,
$\mu_o$ is the viscosity of the oil, and
$\mu_d$ is the viscosity of the displacing liquid.

The value of $\mu_d$ needed to effect a mobility ratio of one typically will be within the range of about 2 to 20 centipoises, but may in some cases be as high as 40 or 50 centipoises.

The present invention may be applied in any secondary recovery process where it is desirable to utilize a displacing liquid of increased viscosity. Thus, the invention may be utilized, for example, in the so-called miscible flood process in which an oil-miscible liquid such as propane is injected to displace oil to a suitable production system. However, the invention is most advantageously used in connection with waterflooding procedures and thus it is preferred in carrying out the invention to utilize suitable aqueous mediums as the buffer and carrier liquids and also as the driving fluid.

In this case, the first and second solute may be selected to form within the reservoir suitable water-soluble or water-dispersible organic compounds which act as viscosifiers in aqueous mediums. Thus, the first and second solutes may be selected to produce water-thickening polymers, such as through the formation of reaction products of nonionic and anionic polymers. The first solute may be a nonionic polymer such as a nitrogenous polymer of a N-alkenyl cyclic amide or carbonate and the second solute may be an anionic polymer containing sulfonate or carboxyl groups. For example, the first solute may be a non-ionic polymer such as poly(N-vinyl-2-pyrrolidone) or poly(3-vinyl-5-methyl-2-oxazolidinone) and the second solute may be an anionic polymer such as poly(sodium p-styrenesulfonate) or sulfonated poly(2,6-dimethyl phenol) in sodium or hydrogen form.

As a further example of solute systems which may be used in carrying out the invention are those in which the first solute is a polymer and the second solute is an inorganic coupling agent. For example, the first solute may be polyvinyl alcohol and the second solute an alkali metal borate such as sodium borate.

The alkaline hydrolysis of acrylic polymers also may be utilized in the present invention. Thus, in this instance, the first solute may be an unhydrolyzed polyacrylamide and the second solute may be an alkali metal hydroxide such as sodium hydroxide which will effect hydrolysis of the amide groups in the polymer thus enhancing the thickening effect of the polymer. The sodium hydroxide should be in a strong concentration, e.g., within the range of 5–15 percent by weight in order to ensure that the hydrolysis reaction proceeds as desired.

The first and second solutes may be injected in any suitable concentrations, depending upon the viscosity requirements of the displacing liquid formed within the formation and the injected carrier liquids. By way of example, in utilizing a nonionic-anionic polymer reaction product as noted above, the first carrier liquid may be an aqueous solution of poly(N-vinyl-2-pyrrolidone) having a molecular weight on the order of 360,000 in a concentration of .05 percent by weight. The second carrier liquid may be a .05 percent by weight aqueous solution of sulfonated poly(2,6-dimethyl phenol), hydrogen form, having a molecular weight of 40,000 and a degree of sulfonation of about 60 percent, i.e., about 6 sulfonic acid groups for each 10 monomer units. In this case the first and second carrier liquids would exhibit viscosities of about one and three centipoises, respectively, and the relatively viscous displacing liquid formed would have a viscosity on the order of 15 centipoises.

Where the carrier liquids are aqueous mediums, the adsorption characteristics thereof may be controlled through suitable adjustment of salinity and/or pH. In this regard, a reduction in adsorption rate and hence an increase in the stripping or desorption characteristic of the liquid can be accomplished by a reduction in salinity and/or an increase in pH. While the adsorption rate can be controlled by pH alone, it is controlled more effectively by salinity and this is preferred in carrying out the invention. Thus, the first aqueous carrier liquid preferably has a salinity greater than that of the second aqueous carrier liquid. Normally, the first carrier liquid should exhibit a salinity within the range of 3–15 percent and the second carrier liquid should have a salinity ranging from fresh water up to 1.5 percent.

Where an aqueous buffer liquid is injected the salinity thereof should be greater than the salinity of the second carrier liquid so that the saturation-adsorption value $C_{1b}$ is greater than the saturation-adsorption value $C_{12}$. Preferably, the salinity of the buffer liquid is at least as great as the salinity of the first carrier liquid in order that the saturation-adsorption value $C_{1b}$ is equal to or greater than the saturation-adsorption value $C_{11}$. Thus, the buffer liquid may typically exhibit a salinity within the range of 3–15 percent.

By the term "salinity," as used herein and in the appended claims, is meant the dissolved salt content of the aqueous liquid expressed in weight percent. As a practical matter, the salinity of the carrier and buffer liquids will usually be controlled by sodium chloride since this salt is inexpensive and usually will be available locally. However, salinity control can be effected by other salts, particularly the other alkali metal halides such as potassium chloride. While divalent metal salts such as calcium or magnesium chloride may sometimes be used, caution should be exercised in this regard since such salts oftentimes will be incompatible with materials in the reservoir or in the injected liquids.

As noted previously, the adsorption characteristics of the solutes in the injected aqueous liquids can be controlled through pH adjustments. If this medium of control is utilized the pH of the first carrier liquid should be less than the pH of the second carrier liquid. The pH of the buffer liquid if injected should also be less than the pH of the second carrier liquid and typically will be about the same as the pH of the first carrier liquid. In general, the first carrier liquid should exhibit a pH within the range of 3.5 to 7.5 and the second carrier liquid should exhibit a greater pH, within the range of 7 to 11.5. The pH of the buffer liquid should be within the range of 3.5 to 7.5.

The liquids introduced into the reservoir in accordance with the invention may be injected in any suitable amounts. While these will vary depending upon the characteristics of a given reservoir, the first and second carrier liquids containing their respective solutes typically will be injected in amounts within the ranges of 10–20 percent and 10–50 percent, respectively, of the total pore volume of the recovery zone. The buffer liquid normally will be injected in an amount within the range of 5–10 percent pore volume of the recovery zone.

As is well known by those skilled in the art, the viscosity of a thickened aqueous flooding medium typically varies with the concentration of the thickening agent. For example, with respect to the sulfonated poly(2,6-dimethyl phenol) described above, a water solution of this polymer in a concentration of 0.01 percent by weight exhibits a viscosity of approximately 1.6 centipoises. By increasing the polymer concentration to 0.1 percent the viscosity of the aqueous flooding medium is increased to 4.8 centipoises. As a further example, a water solution containing a mixture of equal parts of poly (N-vinyl-2-pyrrolidone) and sulfonated poly(2,6-dimethyl phenol) in a total polymer concentration of 0.01 percent by weight will exhibit a viscosity of 1.8 centipoises whereas the viscosity may be increased to 62 centipoises by raising the total polymer concentration to 0.1 percent by weight.

In a further aspect of the invention there is provided a waterflooding method in which a first aqueous carrier liquid contains a solute which functions as a thickening agent without further interaction with a second solute and which exhibits an increased viscosity effect with increased concentration. The first carrier liquid is followed by a second aqceous carrier liquid which in turn is followed by a suitable driving fluid. The first carrier liquid has a greater salinity than that of the second carrier liquid such that the saturation-adsorption value of the thickening agent in the second carrier liquid is less than the saturation-adsorption value of the thickening agent in the first carrier liquid. By this relationship, as the second carrier liquid moves through the reservoir, the concentration of the thickening agent therein will ultimately build to a value greater than the concentration of the thickening agent in the first carrier liquid. Thus, the second carrier liquid will gradually assume a viscosity greater than that of the first carrier liquid.

In carrying out this embodiment of the invention the first solute may be any suitable thickening agent which will exhibit an increased viscosity effect in aqueous solution with an increase in concentration. Thus, the thickening agent may be a polymer such as those described above or in the aforementioned patent to Patton.

The first and second carrier liquids may exhibit salinities similarly as described before with reference to the embodiment of the invention in which interactive solutes are injected. Thus, the first carrier liquid normally will have a salinity within the range of 3 to 15 percent and the second carrier liquid will range in salinity from fresh water to 1.5 percent.

The first and second carrier liquids may also exhibit a relatively low pH and a relatively high pH, respectively. Thus, the first saline carrier liquid may have a pH within the range of 3.5 to 7.5 and the second, lower salinity carrier liquid may have a pH within the range of 7 to 11.5.

Having described certain specific embodiments of the instant invention, it will be understood that further modifications thereof may be suggested to those skilled in the art, and it is intended to cover all such modifications as fall within the scope of the appended claims.

What is claimed is:

1. In the recovery of oil from a subterranean oil reservoir penetrated by spaced injection and production systems defining a recovery zone of said reservoir, the method comprising:
   injecting into said reservoir via said injection system a first carrier liquid containing a first solute which exhibits a saturation-adsorption value $C_{11}$ in said first carrier liquid, said first solute being interactive with the hereinafter recited second solute to form a viscous liquid;
   injecting into said reservoir via said injection system a second carrier liquid containing a second solute which exhibits in said second carrier liquid a saturation-adsorption value $C_{22}$ which is less than said saturation-adsorption value $C_{11}$, whereby as said carrier liquids move through said reservoir said first and second solutes are mixed to produce a viscous displacing liquid within said reservoir;
   moving said viscous displacing liquid through said reservoir in the direction of said production system by injecting a driving fluid into said reservoir via said injection system; and
   recovering oil from said production system.

2. The method of claim 1 further comprising injecting a buffer liquid into said reservoir between said first and second carrier liquids.

3. The method of claim 1 wherein said first solute exhibits a saturation-adsorption value $C_{12}$ in said second carrier liquid which is less than said saturation-adsorption value $C_{11}$.

4. The method of claim 3 further comprising injecting a buffer liquid into said reservoir between said first and second carrier liquids.

5. The method of claim 4 wherein said first solute exhibits a saturation-adsorptjion value $C_{1b}$ in said buffer liquid which is greater than said saturation-adsorption value $C_{12}$.

6. The method of claim 4, wherein said first solute exhibits a saturation-adsorption value $C_{1b}$ in said buffer liquid which is at least as great as the saturation-adsorption value $C_{11}$.

7. The method of claim 3 wherein said first and second carrier liquids are aqueous liquids and said first aqueous carrier liquid has a greater salinity than said second aqueous carrier liquid.

8. The method of claim 7 wherein an aqueous buffer liquid is injected into said reservoir between said first and second aqueous carrier liquids.

9. The method of claim 8 wherein said aqueous buffer liquid has a greater salinity than said second aqueous carrier liquid.

10. The method of claim 8 wherein said aqueous buffer liquid has a salinity at least as great as that of said first aqueous carrier liquid.

11. The method of claim 3 wherein said first and second carrier liquids are aqueous liquids and said first aqueous carrier liquid has a pH lower than that of said second aqueous carrier liquid.

12. The method of claim 11 wherein said first aqueous carrier liquid has a salinity greater than that of said second aqueous carrier liquid.

13. The method of claim 11 wherein an aqueous buffer liquid is injected into said reservoir between said first and second aqueous carrier liquids.

14. The method of claim 13 wherein said aqueous buffer liquid has a pH lower than that of said second aqueous carrier liquid.

15. The method of claim 13 wherein said aqueous buffer liquid has a pH no greater than that of said first aqueous carrier liquid.

16. In the recovery of oil from a subterranean oil reservoir penetrated by spaced injection and production systems defining a recovery zone of said reservoir, the method comprising:
    injecting into said reservoir via said injection system a first carrier liquid containing a first solute which exhibits a saturation-adsorption value $C_{11}$ in said first carrier liquid, said first solute being interactive with the hereinafter recited second solute to form a viscous liquid;
    injecting into said reservoir via said injection system a second carrier liquid which contains a second solute and in which said first solute exhibits a saturation-adsorption value $C_{12}$ which is less than said saturation-adsorption value $C_{11}$ whereby as said carrier liquids move through said reservoir said first and second solutes are mixed to produce a viscous displacing liquid within said reservoir;
    moving said viscous displacing liquid through said reservoir in the direction of said production system by injecting a driving fluid into said reservoir via said injection system; and
    recovering oil from said production system.

17. The method of claim 16 further comprising injecting a buffer liquid into said reservoir between said first and second carrier liquids.

18. The method of claim 17 wherein said first solute exhibits a saturation-adsorption value $C_{1b}$ in said buffer liquid which is greater than said saturation-adsorption value $C_{12}$.

19. The method of claim 16 whrein said first and second carrier liquids are aqueous liquids and said first aqueous carrier liquid has a greater salinity than said second aqueous carrier liquid.

20. The method of claim 19 wherein an aqueous buffer liquid is injected into said reservoir between said first and second aqueous carrier liquids.

21. The method of claim 20 wherein said aqueous buffer liquid has a greater salinity than said second aqueous carrier liquid.

22. The method of claim 21 wherein said first aqueous carrier liquid and said buffer liquid each have a salinity within the range of 3 to 15 percent and said second aqueous carrier liquid has a salinity within the range of fresh water to 1.5 percent.

23. The method of claim 21 wherein said first aqueous carrier liquid and said buffer liquid each have a pH within the range of 3.5 to 7.5 and said second aqueous carrier liquid has a greater pH within the range of 7.0 to 11.5.

24. The method of claim 16 wherein said first and second carrier liquids are aqueous liquids and said first aqueous carrier liquid has a pH lower than that of said second aqueous carrier liquid.

25. The method of claim 16 wherein an aqueous buffer liquid is injected into said reservoir between said first and second aqueous carrier liquids.

26. The method of claim 25 wherein said aqueous buffer liquid has a pH lower than that of said second aqueous carrier liquid.

27. In the recovery of oil from a subterranean oil reservoir penetrated by spaced injection and production systems defining a recovery zone of said resrevoir, the method comprising:
    injecting into said reservoir via said injection system a fisrt saline aqueous carrier liquid containing a thickening agent which exhibits an increased viscosity effect with an increase in concentration and which exhibits a saturation-adsorption value $C_{11}$ in said first carrier liquid;
    injecting into said reservoir via said injection system a second aqueous carrier liquid of a lower salinity than said first carrier liquid whereby said thickening agent exhibits a saturation-adsorption value $C_{12}$ in said second carrier liquid which is less than said saturation-adsorption value $C_{11}$;

injecting into said reservoir via said injection system a driving fluid to move said first and second carrier liquids through said reservoir in the direction of said production system whereby said thickening agent builds up in said second carrier liquid to a higher concentration than in said first carrier liquid; and recovering oil from said production system.

28. The method of claim 27 wherein said first aqueous carrier liquid has a pH lower than that of said second aqueous carrier liquid.

29. The method of claim 27 wherein said first aqueous carrier liquid has a salinity within the range of 3 to 15 percent and said second aqueous carrier liquid has a salinity within the range of fresh water to 1.5 percent.

30. The method of claim 29 wherein said first aqueous carrier liquid has a pH within the range of 3.5 to 7.5 and said second aqueous carrier liquid has a greater pH within the range of 7.0 to 11.5.

References Cited

UNITED STATES PATENTS

| | | | |
|---|---|---|---|
| 2,950,760 | 8/1960 | Bernard | 166—9 |
| 2,954,825 | 10/1960 | Bernard et al. | 166—9 |
| 3,020,953 | 2/1962 | Zerweck et al. | 166—9 X |
| 3,116,791 | 1/1964 | Sandiford et al. | 166—9 |
| 3,175,610 | 3/1965 | Osoba | 166—9 |
| 3,208,518 | 9/1965 | Patton | 166—9 |
| 3,289,759 | 12/1966 | Fisher | 166—9 |
| 3,352,358 | 11/1967 | Williams | 166—9 |
| 3,372,748 | 3/1968 | Cook | 166—9 |
| 3,373,808 | 3/1968 | Patton | 166—9 |
| 3,396,790 | 8/1968 | Eaton | 166—38 X |

DAVID H. BROWN, Primary Examiner

I. A. CALVERT, Assistant Examiner

U.S. Cl. X.R.

166—273